United States Patent
Levi et al.

(10) Patent No.: US 10,999,424 B2
(45) Date of Patent: May 4, 2021

(54) METHOD OF CONTROLLING MOBILE DEVICES IN CONCERT DURING A MASS SPECTATORS EVENT

(71) Applicants: Gad Seri Levi, Ramat Gan (IL); Ilan Tiagai, Swampscott, MA (US)

(72) Inventors: Gad Seri Levi, Ramat Gan (IL); Ilan Tiagai, Swampscott, MA (US)

( * ) Notice: Subject to any disclaimer, the term of this patent is extended or adjusted under 35 U.S.C. 154(b) by 0 days.

(21) Appl. No.: 16/713,326

(22) Filed: Dec. 13, 2019

(65) Prior Publication Data
US 2020/0120200 A1 Apr. 16, 2020

Related U.S. Application Data

(63) Continuation-in-part of application No. 15/558,114, filed on Sep. 13, 2017, now Pat. No. 10,521,178.

(51) Int. Cl.
| | |
|---|---|
| *H04M 1/725* | (2021.01) |
| *H04W 4/30* | (2018.01) |
| *H04W 4/029* | (2018.01) |
| *H04W 4/021* | (2018.01) |
| *H04W 4/50* | (2018.01) |
| *H04M 1/72457* | (2021.01) |
| *H04W 84/18* | (2009.01) |

(52) U.S. Cl.
CPC ....... *H04M 1/72457* (2021.01); *H04W 4/021* (2013.01); *H04W 4/029* (2018.02); *H04W 4/30* (2018.02); *H04W 4/50* (2018.02); *H04W 84/18* (2013.01)

(58) Field of Classification Search
CPC ......... H04M 1/72522; H04M 1/72525; H04M 1/72544; H04M 1/72572; H04W 4/021; H04W 4/029; H04W 4/30; H04W 4/50; H04W 84/18
See application file for complete search history.

(56) References Cited

U.S. PATENT DOCUMENTS

| | | | |
|---|---|---|---|
| 10,521,178 B2 * | 12/2019 | Ziv | H04L 12/184 |
| 2011/0170468 A1 * | 7/2011 | Jain | H04W 48/12 370/312 |
| 2015/0262208 A1 * | 9/2015 | Bjontegard | G06Q 30/0202 705/7.31 |
| 2016/0285842 A1 * | 9/2016 | Booth | H04W 4/18 |

* cited by examiner

*Primary Examiner* — Afroza Chowdhury
(74) *Attorney, Agent, or Firm* — Daniel N. Smith

(57) ABSTRACT

The present invention discloses a system and a method for controlling multiple computerized mobile devices in a mass spectator event, such as a music show, sporting event, political event and the like where the usage of traditional networks such Wi-Fi or Cellular is not feasible economically or technically due to the limited bandwidth. The present invention discloses a method whereby a network of beacons, and, optionally, the GPS location is used to synchronize, coordinate, and control the selection and execution of a sequence of actions on the mobile devices such as playing video, playing vibrations, playing camera flash patterns, illuminating screen patterns, illuminating screen colors, displaying images, displaying texts, playing sounds, or playing music.

16 Claims, 8 Drawing Sheets

METHOD OF CONTROLLING MOBILE DEVICES IN CONCERT DURING A MASS SPECTATORS EVENT

CROSS REFERENCE TO RELATED APPLICATIONS

This application claims priority and is a continuation-in-part of U.S. patent application Ser. No. 15/558,114, filed Sep. 13, 2017; and claims priority to PCT International Application No. PCT/IL2016/050278, filed on Mar. 13, 2016; and claims the benefit of U.S. Provisional Patent Application No. 62/132,950, filed on Mar. 13, 2015, the contents of which are incorporated herein by reference.

FIELD OF THE INVENTION

The present invention generally relates to controlling mobile devices and other peripherals via remote devices, and more specifically to a method for controlling mobile devices in a synchronized and coordinated fashion in a mass spectator event where a traditional network infrastructure like Wi-Fi or Cellular are not technically or economically feasible or cannot be deployed reliably in the venue. Instead of a traditional Wi-Fi or Cellular network, a network of beacons is used to activate various actions on the mobile devices in a spectator event.

BACKGROUND OF THE INVENTION

Generally, spectacle events are limited to utilizing the audio and visual effects provided by the artists and/or operator of a venue holding the event. Traditionally, venue speakers, scoreboards, and screens are used to supplement a performer's and/or athlete's performance. Currently, there is a lack of additional multimedia interaction for spectators, and their personal mobile devices, to supplement the traditional audio/visual elements at the venue.

The current solutions to augment the user experience in spectacle events using the users' mobile devices rely on traditional networks such as Wi-Fi or Cellular where each device is both a transmitter and receiver the network and, as such, needs to share the overall network bandwidth to send and receive data, including the network protocol data that is required to facilitate communications. These networks tend of work well in environments where radio noise between devices is relatively low and the network bandwidth is sufficiently large to enable the required data to arrive at each device reliably.

There is a need for providing enhanced experiences for the spectators attending spectacles, such as events having a range of attendees or audience members numbering from a few in a small performance room to stadium-filling crowds. There is also a need for providing a mechanism where mobile devices in mass spectator events can be commanded reliably without a traditional network such as Wi-Fi or Cellular.

SUMMARY OF THE INVENTION

The subject invention discloses a method of controlling a plurality of mobile electronic devices at an audience event using a controller software application on a computing device and a network of beacons, the method comprising: downloading a mobile software application onto each mobile electronic device; preparing unique configuration and content data for the controller software application for the audience event, wherein the configuration and content data varies based on the specific physical location in a venue holding the audience event; configuring the network of beacons for the venue for transmission of communications protocol commands from the controller software application on the computing device; installing the network of beacons at the venue; launching the mobile software application onto each mobile electronic device during the audience event, wherein the mobile software application prepares each mobile electronic device that does not support a communications protocol to receive a plurality of communications protocol commands from the network of beacons; determining the specific physical location of each mobile electronic device in the venue holding the audience event; transmitting wirelessly the unique configuration and content data to the plurality of mobile electronic devices during the audience event from the network of beacons based on the specific physical location in the venue during the audience event; transmitting wirelessly the plurality of communications protocol commands during the audience event from the computing device to the mobile electronic devices from the network of beacons; recognizing and executing the plurality of communications protocol commands on the mobile electronic devices, wherein the plurality of communications protocol commands comprises a plurality of timestamps to synchronize the execution of the commands on the mobile electronic device into a unique sequential order.

In embodiments of the subject invention, the communications protocol commands are selected from the group consisting of MIDI, OCA (Open Sound Control), DMX512 (Digital Multiplex), ART-NET, and sACN (Streaming Architecture for Control Networks).

In embodiments of the subject invention, the specific physical location of the plurality of mobile electronic devices in the venue holding the audience event is acquired by a method selected from the group consisting of user input, GPS, beacon proximity, venue seat number, and venue section number.

In embodiments of the subject invention, the plurality of executed communication protocol commands creates an image from the display screens from the plurality mobile electronic devices by assigning different executed communication protocol commands to display different colors based on the specific physical location of each mobile electronic device in the venue holding the audience event.

In embodiments of the subject invention, the plurality of communications protocol commands is selected from the group consisting of playing video, playing vibrations, playing camera flash patterns, illuminating screen patterns, illuminating screen colors, displaying images, displaying texts, playing sounds, playing music, streaming audio, or streaming video.

In embodiments of the subject invention, the unique configuration and content data sent contains data elected from the group consisting of video stream data, audio playback data, image data, or text data.

In embodiments of the subject invention, the mobile software application on each mobile device translates the plurality of communications protocol commands from the transmitted natural language to the natural language of each mobile device.

In embodiments of the subject invention, the plurality of communications protocol commands transmitted do not interfere with mobile device protocols on the plurality of mobile electronic devices.

In embodiments of the subject invention, the executed plurality of communications protocol commands synchronizes the plurality of mobile electronic devices in real-time to perform a specific action simultaneously.

In embodiments of the subject invention, the plurality of communications protocol commands is transmitted in a unique sequential order in pre-defined time periods with a command code, a sequence number, a current-time for the controller software application, and a time for executing the command.

In embodiments of the subject invention, the plurality of executed communication protocol commands creates a musical instrument emulator on the plurality mobile electronic devices to complement the music at the audience event, wherein the choice of the musical instrument emulated, the volumes and pitches of the sounds emitted by the mobile devices, and the pitches of the sound emitted is determined by the plurality of executed communication protocol commands.

In embodiments of the subject invention, the plurality of executed communication protocol commands creates a musical instrument emulator on the plurality mobile electronic devices to complement the music at the audience event, wherein the choice of the musical instrument emulated, the volumes and pitches of the sounds emitted by the mobile devices, and the pitches of the sound emitted is determined by user input.

In embodiments of the subject invention, the plurality of executed communication protocol commands creates a musical instrument emulator on the plurality mobile electronic devices to complement the music at the audience event, wherein the choice of the musical instrument emulated, the volumes and pitches of the sounds emitted by the mobile devices, and the pitches of the sound emitted is determined by movements of the phone selected from the group consisting of shaking, rotating, moving up, moving down, moving left, moving right, moving clockwise, moving counterclockwise, tilting up, tilting down, touching the screen, and exposing the phone to light.

The subject invention also discloses a method of controlling a plurality of mobile electronic devices at an audience event using a communications protocol controller software application on a computing device and a compatible communications protocol software controller, the method comprising: a) downloading a mobile software application onto each mobile electronic device; b) preparing unique configuration and content data for the communications protocol controller software application for the audience event, wherein the communications protocol controller software application translates communication protocol commands to mobile software application commands for the plurality of mobile electronic devices; c) establishing a connection between the compatible communications protocol software controller and the communications protocol controller software application on the computing device; d) launching the mobile software application onto each mobile electronic device during the audience event, wherein the mobile software application prepares each mobile electronic device to receive a plurality of translated communication protocol commands from the communications protocol controller software application; e) transmitting wirelessly the unique configuration and content data to the plurality of mobile electronic devices during the audience event; f) transmitting a plurality of communication protocol commands from the compatible communications protocol software controller to the communications protocol controller software application during the audience event; g) translating the received plurality of communication protocol commands by the communication protocol controller software application into the plurality of translated communication protocol commands during the audience event; h) transmitting wirelessly the plurality of translated communication protocol commands from the computing device to the mobile electronic devices during the audience event; and i) recognizing and executing the plurality of translated communication protocol commands on the mobile electronic devices during the audience event, wherein the plurality of translated communication protocol commands comprises a plurality of timestamps to synchronize the execution of the commands on the mobile electronic device into a unique sequential order.

The subject invention further discloses a method of controlling a plurality of mobile electronic devices at an audience event using a controller software application on a computing device, the method comprising: downloading a mobile software application onto each mobile electronic device; preparing unique configuration and content data for the controller software application for the audience event; launching the mobile software application onto each mobile electronic device during the audience event, wherein the mobile software application prepares each mobile electronic device that does not support a communications protocol to receive a plurality of communications protocol commands from the computing device; transmitting wirelessly the unique configuration and content data to the plurality of mobile electronic devices during the audience event; transmitting wirelessly the plurality of communications protocol commands during the audience event from the computing device to the mobile electronic devices; recognizing and executing the plurality of communications protocol commands on mobile electronic devices, wherein the plurality of recognizing commands comprises a plurality of timestamps to synchronize the execution of the commands on the mobile electronic device into a unique sequential order.

In embodiments of the subject invention, the communications protocol may be MIDI, OCA (Open Sound Control), DMX512 (Digital Multiplex), ART-NET, or sACN (Streaming Architecture for Control Networks).

It is an object of the present invention to disclose a method of controlling multiple mobile electronic devices using a controller application, a portion of the mobile electronic devices do not support multicast, the method comprising transmitting commands to the mobile electronic devices via UDP, transmitting commands to the mobile electronic devices via mDNS, mobile applications installed in the multiple mobile electronic devices and interacts with the controller application listens to the mDNS and receives commands from the controller application via the mDNS.

In some cases, the controller application sends information in a language used by a user of a mobile electronic device of the multiple mobile electronic devices. In some cases, the method further comprises broadcasting the commands by the controller application. In some cases, the method further comprises executing the commands by the controller application by the mobile applications.

In some cases, the method further comprises downloading content from a content server prior to receiving the commands from the controller application. In some cases, the method further comprises the mobile application filters a command from a plurality of optional commands according to a physical location of the mobile electronic device.

It is another object of the present invention to disclose a method of synchronizing multiple mobile electronic devices using broadcasted messages, comprising multiple mobile electronic device receive multiple messages that contain commands in predefined intervals, said messages contain command code, sequence number, the current time of the controller and the expected time of executing the command; after receiving multiple messages, the mobile electronic device identifies two messages received at time difference closest to the predefined periods.

In some cases, the method further comprises determining a local time offset for each mobile electronic device according to the difference between subsequent messages. In some cases, the method further comprises executing commands from the controller according to the time offset of each mobile electronic device. In some cases, the commands are transmitted from the controller via multicast and mDNS IP address.

It is another object of the present invention to disclose a method for coordinating operation of multiple mobile electronic devices, comprising each of the multiple mobile electronic devices acquires its location; each of the multiple mobile electronic devices receives a map of an area in which the multiple mobile electronic devices are located; each of the multiple mobile electronic devices identifies its location in the map and identifies a command to be executed out of a plurality of optional commands received in the map.

In some cases, the location of the multiple mobile electronic devices is acquired from a user input. In some cases, the location of the multiple mobile electronic devices is acquired via GPS. In some cases, the map creates an image by assigning different colors to different mobile electronic devices.

It is an object of the present invention to disclose a method of controlling a plurality of mobile electronic devices using a controller application which sends commands and data to a mobile application running on each of the plurality of mobile electronic devices using Multicast UDP protocol. The method overcomes the problem where a portion of mobile electronic devices does not support Multicast UDP by overloading the mDNS (Multicast Domain Name Server) protocol.

In some cases, the controller application sends information to the mobile application running on each of the plurality of mobile electronic devices and each mobile application obtains a translation of the information to the language used by the mobile electronic device. In some cases, the method further comprises broadcasting the commands and data from the controller application. In some cases, the method further comprises executing the commands of the controller application by the mobile applications.

In some cases, the method further comprises mobile applications downloading content from content server prior to receiving the commands from the controller application. In some cases the mobile application does not download the content but rather receives the content from the controller application in real-time to be processes on-the-fly, for example a streaming video or audio. In some cases, the data and commands sent from the controller application include encoded meta-data such as the location of the mobile device that is associated to the command and data and the mobile application filters the received commands and data based on its location in the venue.

It is another object of the present invention to disclose a method of synchronizing a plurality of mobile electronic devices using synchronization commands sent at a predefined interval period from the controller application. The synchronization commands comprising command code, sequence number, the current time of the controller application, and the time for executing the command. Each mobile application receives said synchronization commands and selects a set of synchronization commands closest to the predefined interval period and uses that set to determine the time offset between the controller application time and the mobile application time.

It is another object of the present invention to disclose a method of coordinating operation of the plurality of mobile electronic devices, comprising of each of the plurality of mobile electronic acquiring its location; the mobile application received a mapping of its location to a group number. The group number is encoded in the header of data and commands received by the mobile application which filters the data and command to apply and execute the data and commands intended for its group. The group may be defined by several mobile devices located in a specific location.

A second coordination method of the present invention is disclosed comprising the same data sent to the plurality of mobile electronic devices along with a map of the venue enabling each mobile electronic device to extract its own portion of the overall data to be played and/or displayed, according to the mobile device location acquired independently by each mobile device.

It is another object of the present invention to disclose a method for enabling a communications protocol controller to control a plurality of mobile electronic devices using the controller application. The method comprising of the controller application receiving the communications protocol commands from the communications protocol controller and converting them to commands configured to be sent to the plurality of mobile electronic devices.

It is another object of the present invention to disclose a method for enabling the controller application to control a plurality of communications protocol enabled devices comprising of augmenting the controller application commands with communications protocol commands and having the controller application send both types of commands to the plurality of mobile devices as well as communications protocol commands to the plurality of communications protocol enabled devices.

It is an object of the present invention to disclose a method of controlling multiple mobile electronic devices using a network of beacons where each beacon transmits a set of predefined data to the mobile devices. The mobile devices, in turn, are set up to accept these predefined beacon data transmissions and, based on the value of the received data, activate a sequence of predefined actions such as vibrations, LED flashes, playing of video files, playing of audio files, illuminating the LCD in different colors, displaying images, or process user movements to simulate musical instruments.

It is also an object of the present invention to disclose a method of using the device's GPS coordinates to control and activate various actions on the device.

In some cases, all the content files and sequences of commands are pre-loaded into the mobile devices before the event starts. This is because the network cannot be relied upon to support the dynamic loading to contents files and other data at the time and place of the event. The mobile device software is set up to monitor the transmission bursts of data from the beacon and, based on the received data, activate a sequence of actions. For example, when the beacon transmits its minor and major identification number, the mobile devices can map these number into a sequence of actions.

In some cases, the beacon network can be configured to transmit the individual commands the mobile device application expects to execute a particular command such as vibrate the device, illuminate the LCD screen, or start playing a video file.

In some cases, the beacon network can be configured to propagate predefined signals to other beacons which, in turn, activate actions on mobile devices in their vicinity. As an example, this concept can be used to guide the audience "wave" at a football game.

In some cases, the beacon data transmitted is used in conjunction with the devices GPS location to select the place and start time of an action or sequence of action. As an example of this use case, the American flag can be painted on the audience in a baseball game using the mobile devices LCD screen.

In some cases, the beacon data can contain both the identifier for the sequence of events to trigger as well as the start time to start executing the sequence.

In some cases, the timing of the actions is programmed into the beacon network such that the beacons propagate the data between them in a synchronized coordinated fashion and, as a result, the actions on the mobile devices are triggered in a synchronized coordinated fashion.

In some cases, the sequence of defined actions on the mobile devices are programmed to start at a predefined absolute time but the sequence itself is determined by the closest beacon to the mobile device.

In some cases, the GPS location is used to determine that start time of the sequence of actions but the sequence itself is determined by the closest beacon to the mobile device.

BRIEF DESCRIPTION OF THE DRAWINGS

Some embodiments of the invention are herein described by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE INVENTION

Figure 1:
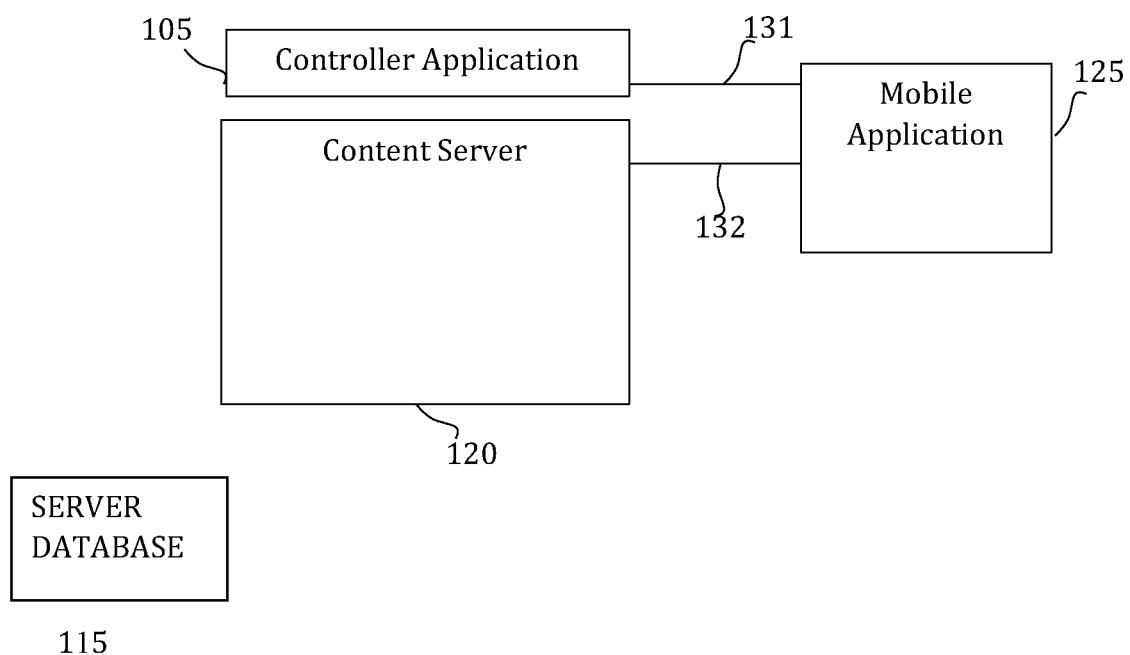
FIG. 1 discloses a system for controlling multiple devices in concert during a mass spectator event, according to exemplary embodiments of the present invention.

The present invention discloses a system and a method for controlling multiple computerized mobile devices in a mass spectator event, such as a music show, sporting event, political event and the like. The method disclosed in the present invention enables a remote computerized device operating a controller application to send commands and data to multiple computerized mobile devices. The commands sent by the remote device may by such as device vibrate, turn on and off the camera flash, illuminate the display unit, and the like. The data sent by the remote device may by such as video stream, audio stream, images, text. The computerized mobile devices may operate a mobile application in order to receive and manage the communication with the remote device. The mobile application can execute the commands and utilize the data received by the computerized mobile devices.

The present invention also discloses a method of sending data and commands using UDP Multicast protocol by overloading an existing UDP multicast service known as mDNS (Multicast Domain Name Server) in such a way as to get the data across to computerized mobile devices that do not support UDP Multicast protocol. All Mobile electronic devices support the mDNS protocol, even those mobile electronic devices that do not support Multicast UDP otherwise. By defining our data and command set in such a way as to not interfere with the mDNS protocol, we are able to use the mDNS channel to transmit data and commands from the controller application to the plurality mobile electronic devices. The mDNS server expects a certain structure in the packets to be received. Packets that do not contain the correct structure are discarded by the mDNS server. The controller application sends command to the plurality of mobile devices that do not contain the expected header and are thus discarded by the mDNS server. The mobile application is listening for commands on the same IP address as the mDNS server (224.0.0.251:5353). The mobile application, however, is programmed to recognize the commands created by the controller application and discard other commands such as DNS requests from other devices.

The present invention also discloses a method of synchronizing computerized mobile devices in order to perform specific actions simultaneously such as playing a media file, vibrating the mobile device, turning on or off the camera light of a mobile device, playing a particular sound, displaying a text and the like. In some cases, the computerized mobile device synchronization may be based on the physical location of the computerized mobile devices in the venue holding the event. In some other cases, the computerized mobile device synchronization may be based on information encoded by the controller application to the commands or to the data sent to computerized mobile devices.

There are two scenarios for playing media (audio/video) using the mobile electronic devices. In the first scenario, the media file is downloaded to the device before it is played. The entire audio/video file is downloaded from the content server to the device any time before the event (does not have to be at the venue). Thus, the media file resides on the mobile electronic device and a command from the controller application is send to select the file to be played. Then, the set of synchronization commands are given so that the mobile devices can synchronize. Finally, the "Start" command is sent to the devices to start playing the selected media file.

In the second scenario, no media file exists on the device: The media is not downloaded from the content server. Instead, the media data is streamed from the controller application via UDP multicasting to all the devices in the venue.

In both scenarios, for synchronization purposes: Exactly the same set of synchronization commands is sent to the mobile applications so that the mobile application can compute the correct time to start playing the streamed data (that is buffered). In both scenarios, for coordination purposes: The streamed data is composed of frames. Each frame has a header which contains (in addition to the standard information like bit-rate, compression info), the Funtoad specific meta-data like group number, LCD action, vibration duration, and the like.

FIG. 1 discloses a system for controlling multiple devices in concert in a mass spectator event, according to exemplary embodiments of the present invention. The system is designed to maintain a plurality of communications with computerized mobile devices in order to send them content and commands. FIG. 1 shows a content server 120 designed for populating content and configuration data to the computerized mobile devices. The content server 120 communicates with the mobile application 125, via communication channel 132 in order to send content. The communication channel 132 may be any standard wireless communication network. The content communicated by the content server 120 may comprise of configuration data, video files, sound files, text files, image files and the like. The system also comprises controller application 105 that communicates with the mobile applications 125 via communication channel 131 in order to send commands and data to the computerized mobile devices at the venue. The commands sent by the system may include commands such as: Play media content such as videos or sounds, play a video and audio streams, display text message, send text translation, display the screen or other display unit in a specific color, vibrate the mobile device, and the like. For example, a mobile application 125 communicating with content server 120 via communication channel 132 and with controller application 105 via communication channel 131, in order to receive content related to a specific event. The controller application 105 sends a command to play a video stream downloaded from content server 120. The mobile application 125 receives the command, and plays the video stream. In some exemplary embodiment of the present invention the controller application 105 may send to computerized mobile device some operational commands such as: Vibrate the device, turn the camera light on or off, turn the LED on or off, obtain GPS location, record from the device's microphone, allow a specific device to send data to the other peripherals at the venue, change the default language of the device, and the like. For example, the controller application 105 sends a command for vibrating the computerized mobile devices in a specific time at the event, to all computerized mobile devices in the venue holding the event. The mobile application operating on the computerized mobile devices receive the command and simultaneously vibrate the computerized mobile device. FIG. 1, also comprises content server database 115 in order to store information related to the mobile computerized mobile devices communicating with the content server 120. The content stored in the server database 115 may comprise data and information such as: computerized mobile devices' unique identifiers, geographical location of each particular computerized mobile device, and the like. In some optional embodiments of the present invention the server database 115 may be independent and located in a physical device other than the content server 120. The server database 115 located in different device may also be hosted by an independent operation system and communicate with the content server 120 via standard communication process and method exist in the industry.

Figure 2A:
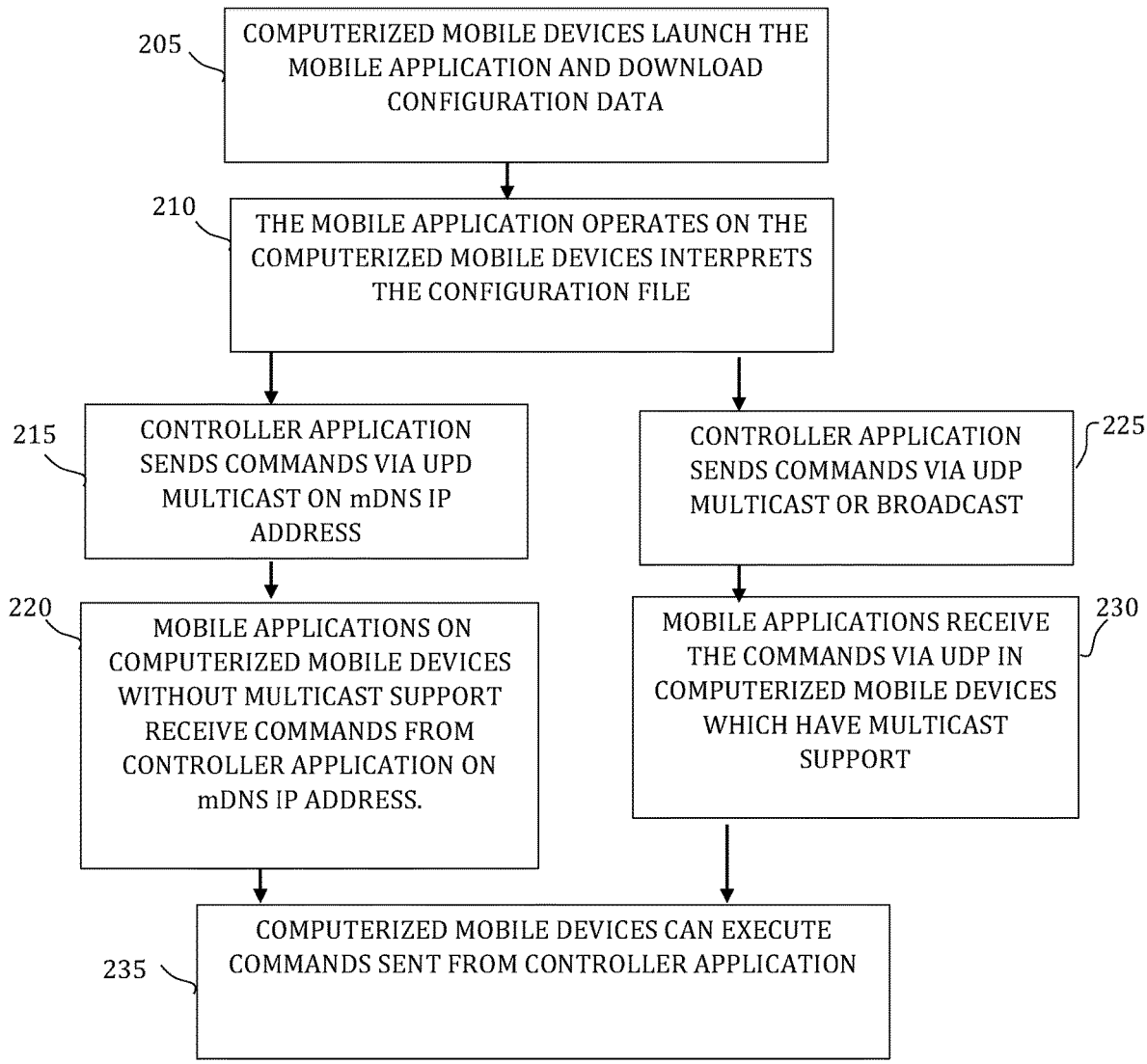
FIG. 2A discloses a method of preparing multiple devices to operate in concert during a mass spectator event, according to exemplary embodiments of the present invention.

FIG. 2A discloses a method of preparing multiple devices to operate in concert in a mass spectator event, according to exemplary embodiments of the present invention. In step 205, a person operating a computerized mobile device launches a mobile application and receives configuration data prepared for a specific event. The configuration data received by the computerized mobile devices may comprise multiple parameters such as: List of video files used in the event, list of audio files used in the event, list of image files used in the event, list of translation text files used in the event, the network service set identifier also known as SSID of the venue holding the event, a list of group numbers, and the like. The mobile application operating on the computerized mobile devices is also designed to receive the configuration data from a remote location, from any network designed to provide file hosting and communication services. For example, a person intending to attend an event can receive the configuration settings in advance using any internet service.

In step 210, the mobile application operates on the computerized mobile devices interprets the configuration data for utilizing the information. Such interpretation performed by the mobile application may be parsing action, read a data file and the like and downloads the various video files, audio files, image files, text files, and other files specified in the configuration data from the content servers. The content server can reside locally at the venue or in another location with internet connectivity. In some cases, the mobile application may send information or data to the content server such as location of the mobile device in the venue represented by a seat number, a section number, and the like, language used by the mobile device, selections made within the mobile device application, device type, and the like.

Step 215 discloses the controller application, operated by a person controlling the mobile devices, sending commands utilizing a Multicast Domain Name Server IP address also known as mDNS. The mDNS IP address is originally designed to resolve host names to Internet Protocol addresses, also known as IP addresses, within small networks that do not include a local domain name server. Thus, the controller application and mobile devices are programmed to utilize the familiar mDNS channel for communications. The commands received by the mobile application may comprise actions such as play a video file or play a sound file which was downloaded as disclosed in step 210. In some cases, the command may also comprise actions such as display the device screen or display unit in a particular color, vibrate the device, and the like. In some cases, the command may be executed when received.

In some other cases, the command may be associated with a timestamp to execute in order to execute the command. The timestamp may be any readable time value which the mobile application can utilize. In some other cases, the time value can also contain the phrase "now", for executing when received. In some cases, the commands received by the mobile application can be multiple commands in a sequence with a timestamp attached to each command. The mobile application receives a command sequence with timestamp can execute each command based on its timestamp.

Step 225 discloses sending commands to the computerized mobile devices, via a utilization of standard multicast method based on User Datagram Protocol (also known as UDP). The commands are sent by the controller application are identical to the commands and information sent via mDNS and disclosed in step 215. In step 220, mobile devices are configured to receive data on mDNS IP address. Similarity, in step 230, the computerized mobile devices receive the commands sent from the controller application via UDP Multicast or Broadcast on any valid Multicast or Broadcast address other than mDNS IP Address. For example, in case Internet Protocol version 4, also known as IPv4 is used, address 224.0.0.251:5353 is the IP address of the mDNS. In step 235, all devices receive the commands and process then to take actions like play a video stream, light the screen, and the like.

Figure 2B:
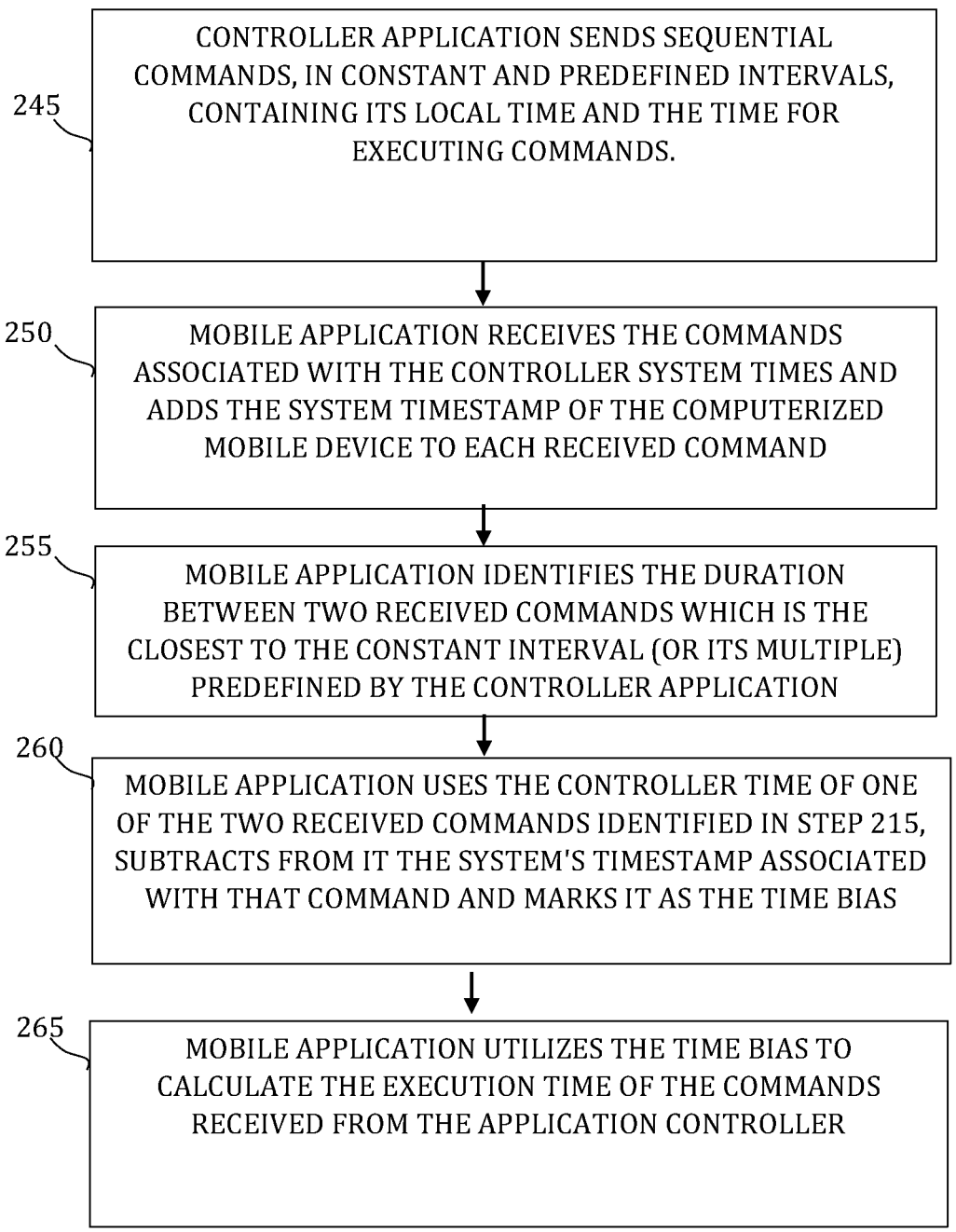
FIG. 2B discloses a method for synchronizing the actions of the computerized mobile devices, according to an exemplary embodiment of the present invention.

FIG. 2B discloses a method for synchronizing the actions of the computerized mobile devices, according to an exemplary embodiment of the present invention. In step 245, the controller application sends sequential synchronization commands. Each command in the sequence contains the command code, the sequence number, the controller application current-time, and the time for executing the command. The period between the commands in the sequence is constant and predefined. The controller application and mobile application are designed and configured to utilize identical periods. The controller application sends sequential commands to the computerized mobile devices, in the predefined periods. In step 250, the mobile applications receive the commands associated with the controller application times, and then add to each command the local timestamp of the computerized mobile device receiving time. For example, a command received by the mobile application comprises the command code, sequence number, controller application system time, and the time for executing the command. In step 255, the mobile application identifies the commands and their associated timestamps which are closest to the period times. For example, when the controller application intervals were 300 milliseconds between the commands, the mobile application measures the period between the commands according to the computerized mobile device's timestamp and identifies the duration which is the closest to 300 milliseconds (or a multiple thereof). In step 260, the mobile application uses the controller application time and the timestamp of the computerized mobile device of one of the commands identified in step 255 and subtracts the timestamp of the computerized mobile device from the controller application time. Then, the mobile application marks the result of the subtraction operation as time offset. In step 265, the mobile application utilizes the time offset to calculate the actual execution time of the commands received from the application controller. For example, in case the time offset is 900 milliseconds, the mobile application will take the command Start Time from any one of the synchronization commands; add 900 milliseconds to it to get time to start the command relative to its own clock. In some exemplary cases, each synchronization command has the command start time relative to the controller time, not relative to the mobile device time. So, after the mobile application calculates the offset, it adds the calculated offset to the mobile device time to obtain the start time relative to the mobile device.

Figure 3:
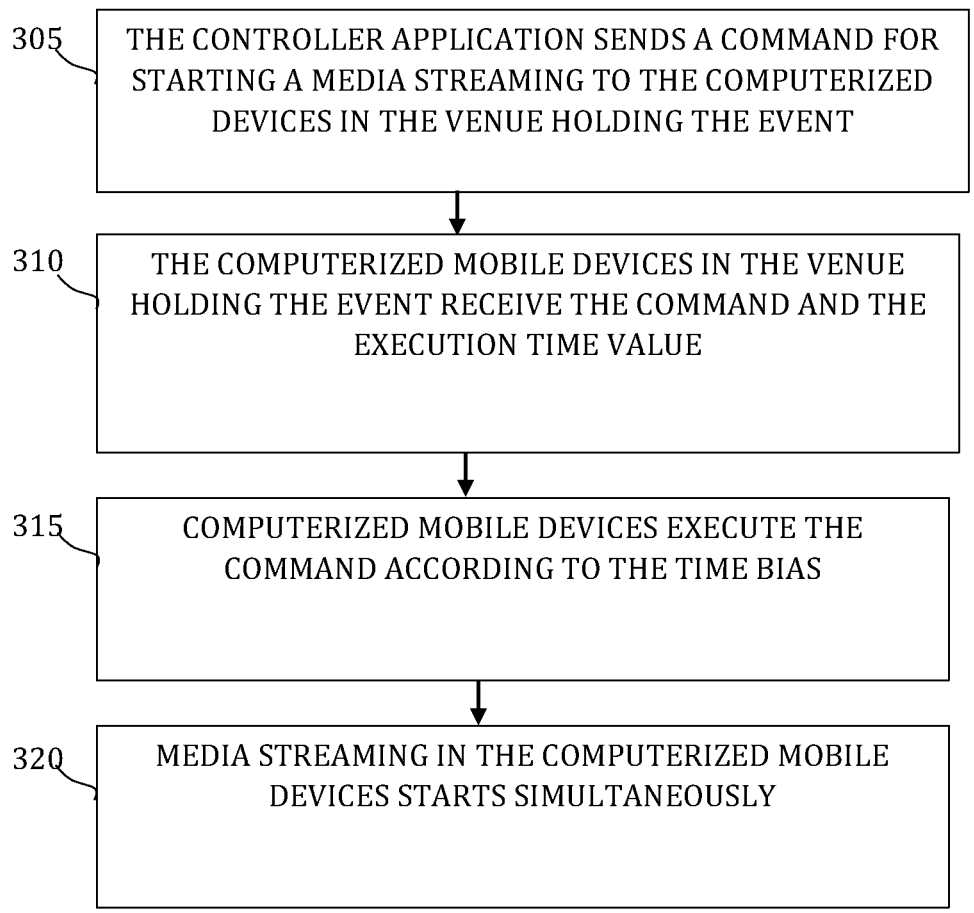
FIG. 3 shows a method of employing multiple computerized mobile devices for streaming media in concert, according to exemplary embodiments of the present invention.

FIG. 3 shows a method of employing multiple computerized mobile devices for streaming media in concert, according to exemplary embodiments of the present invention. In step 305, a controller application, operated in the venue holding the event, sends a command to start a media streaming to the computerized devices in the venue holding the event. The media streaming can be a video file, an audio file and the like. In some cases, the commands sent to the computerized mobile devices can contain commands to download files such as video files, digital image files, audio files and the like. In step 310, the computerized mobile devices in the venue holding the event receive the commands and identifies the time value for execution of the command. In Step 315, computerized mobile devices execute the command according to the received time value and the time offset as disclosed in FIG. 2, step 225. For example, a computerized mobile device receives a command to start a video streaming in a certain time. The computerized mobile device utilizes the time offset as disclosed in FIG. 2, step 225 to acquire the accurate time for starting to play the streamed media data. In step 320, the computerized mobile devices in the venue hosting the event start playing the video simultaneously. In some cases, during a video streaming process additional media files can be downloaded to the mobile device.

Figure 4:
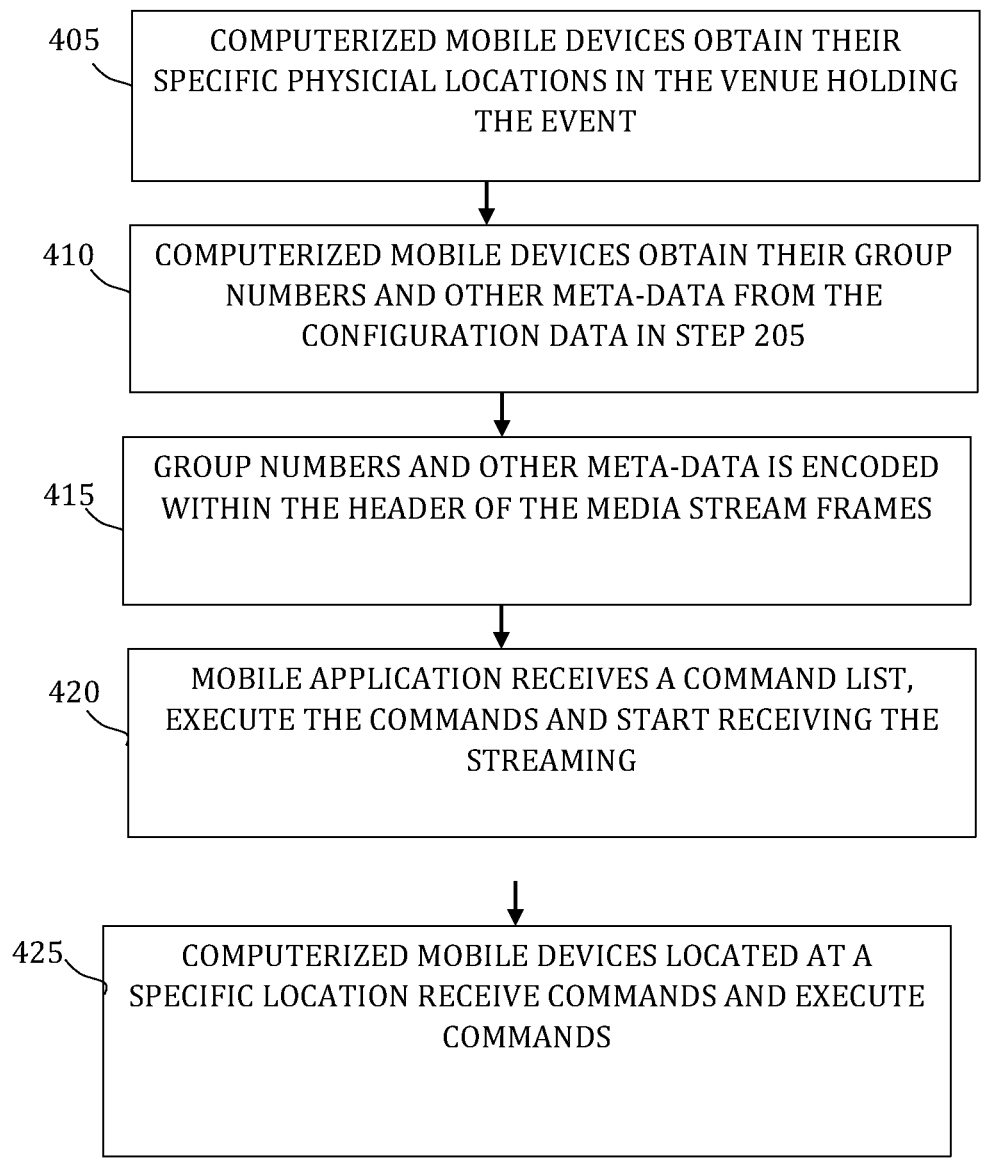
FIG. 4 discloses a method for coordinating the actions of a plurality of computerized mobile devices based on their specific location within the perimeter of the venue holding the event, according to exemplary embodiments of the present invention.

FIG. 4 discloses a method for coordinating the actions of a plurality of computerized mobile devices based on their specific location within the perimeter of the venue holding the event, according to exemplary embodiments of the present invention. In step 405 the computerized mobile devices obtain their specific physical location in the venue holding the event. The location of the computerized mobile device may be the seat number entered by the person who operates the computerized mobile device, or the mobile application can compute the location based on beacons placed throughout the venue, or by some other method. In step 410, using the configuration data downloaded in step 205, the mobile application determines the GN (Group Number) for the specific media file or action. The GN values may not be unique. For example, all devices in rows 1, 3, 5, 7, 9 may have GN=1. And all devices in rows 2, 4, 6, 8, 10 may have GN=2.

Step 415, discloses encoding the group numbers (GNs) within the header part of the frames composing the media stream. Some media standard, for example, AVI File Format, is a container format that enables the addition of application specific meta-data into the frame headers. Adding the GN into the frame header allows for mapping of commands and data to specific plurality of mobile electronic devices. In step 420, each mobile electronic device which receives the media stream can utilize the GNs encoded to the video streaming or in the commands to identify the specific data required to be used or displayed by the device.

In step 425 the controller application sends commands to computerized mobile devices displaying a video file. The commands are associated with multiple GN's represent specific physical location in the venue hosting the event. The computerized mobile devices identified by the GN's associated with the command may execute the commands. Commands such as: Play a video file, stop the streaming, light the screen in a specific color and the like.

Figure 5:
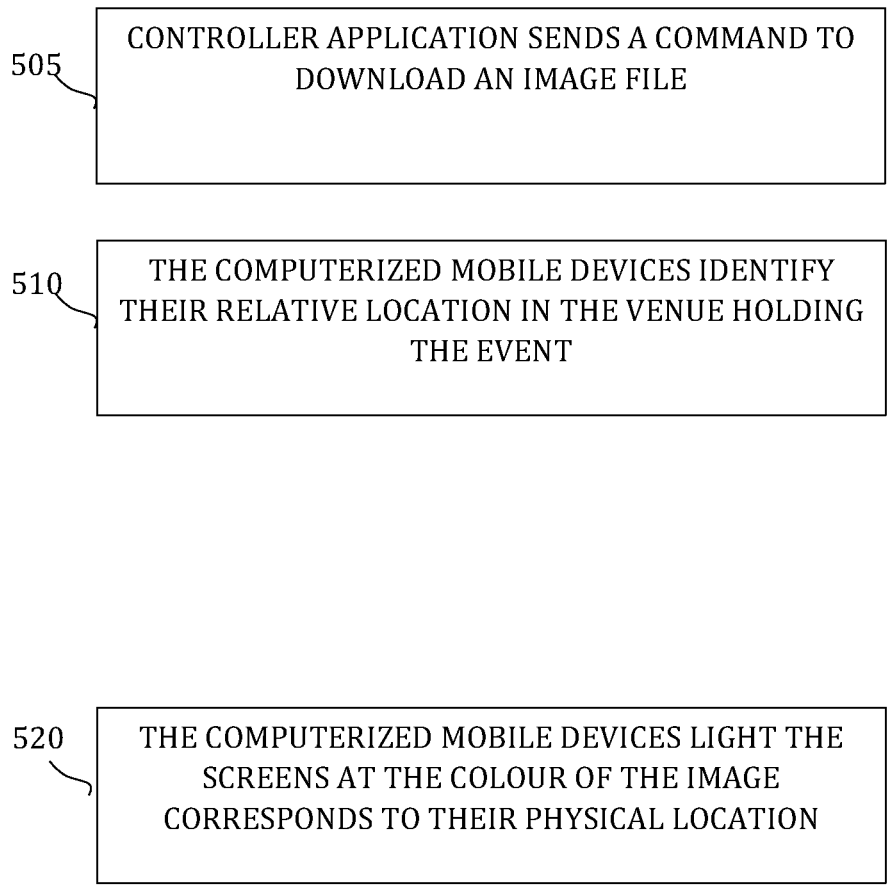
FIG. 5 discloses a secondary method for coordinating a plurality of mobile devices where they all receive the same data and each mobile device will play or display a portion of data according to its physical location in the venue.

FIG. 5 discloses a secondary method for coordinating a plurality of mobile devices where they all receive the same data and each mobile device will play or display a portion of data according to its physical location in the venue. The data can be an image, video, sound, and the like. For example, all mobile devices in a rectangular venue can receive an image of the American flag. Each mobile device, based on its location, will display the small portion of the entire image whereby the plurality of mobile devices in the venue collectively display the entire American flag to within the resolution allowed by the number and density of mobile devices. In step 505 the controller application sends a command to download an image file of the Italian flag. The computerized mobile devices received the command may identify the location of the file. The file location may be a content server located within the local network, an image located in a server on the internet, a server introduces an FTP service also known as File Transfer Protocol and the like. In step 510, the computerized mobile devices identify their relative location in the venue holding the event, as disclosed in FIG. 4. The locations identified by the computerized mobile devices may be the seat number or specific physical location. In step 520, the computerized mobile devices light the screens at the color of the flag corresponds to their physical location.

Figure 6:
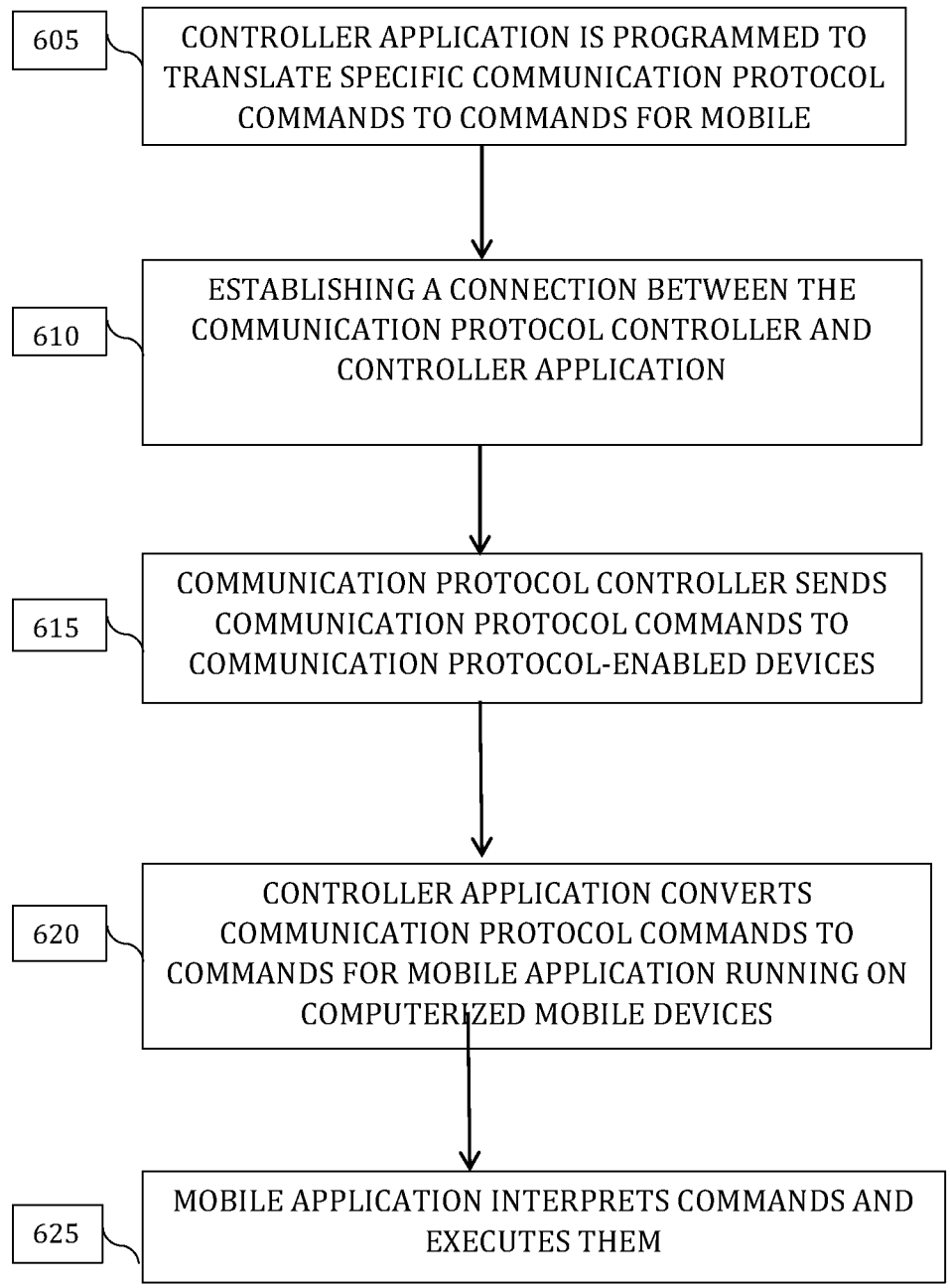
FIG. 6 discloses a method of enabling a communications protocol controller to control a plurality of mobile devices by sending communications protocol commands to the controller application which, in turn, converts the communications protocol commands to command for the mobile electronic devices.

FIG. 6 discloses a method of allowing a communications protocol, such as MIDI (Musical Instrument Digital Interface), OCA (Open Sound Control), DMX512 (Digital Multiplex), ART-NET, or sACN (Streaming Architecture for Control Networks), controller to control a plurality of mobile devices. A communications protocol controller refers to any hardware or software that generates and transmits communications protocol data. MIDI, OCA, DMX512, ART-NET, and sACN are technical standards that describe a communication protocol, digital interface, and connectors and allows a wide variety of electronic musical instruments, computers, lighting fixtures, speakers, LCD displays, and other related devices to connect and communicate with one another.

In step 605, the controller application is programmed to translate specific communications protocol commands to specific commands for the mobile application running on the mobile devices. For example, the MIDI command "193 21" to change the program sound on MIDI channel 2 to program #21, can be programmed to vibrate the mobile devices for 21 milliseconds.

In step 610, in addition to the existing connections of the communications protocol controller to the communications protocol enabled devices, a new connection to the controller application is established. In step 615, the communications protocol controller sends commands to the communications protocol enabled devices, one of which is the controller application.

In step 620, the controller application processes the communications protocol command and converts it to one of many commands for the mobile devices running the mobile application. For example, when the MIDI controller sends the MIDI command "193 21", the MIDI command is received by the MIDI enabled devices, including the controller application. The controller application is programmed, in this example, to send a command to the mobile devices to vibrate for 21 milliseconds. In step 625, the mobile application received the command to vibrate for 21 milliseconds and commands the mobile device to vibrate for 21 milliseconds.

Figure 7:
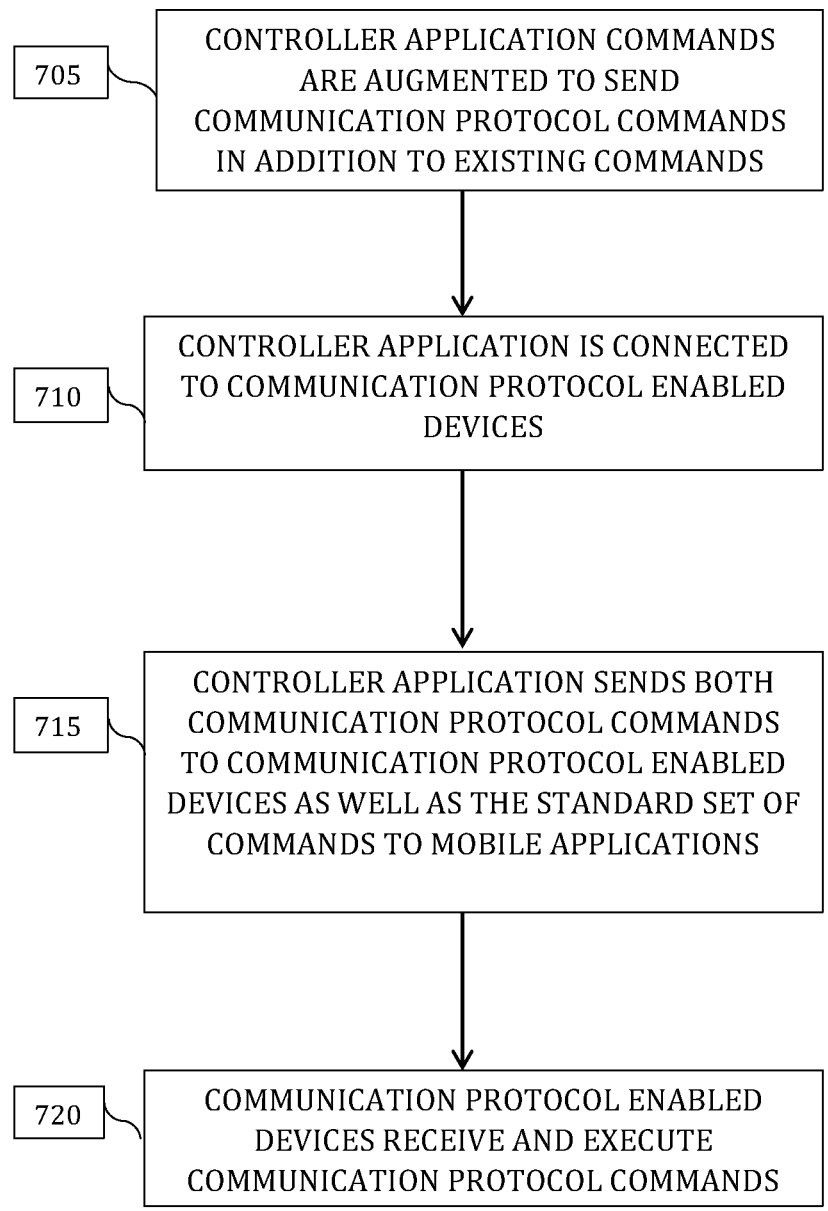
FIG. 7 discloses a method of enabling the controller application to control a plurality of communications protocol enabled devices and a plurality of mobile electronic devices simultaneously.

FIG. 7 discloses a method for enabling the controller application to control communications protocol enabled devices in addition to controlling the mobile devices. In step 705, the controller application commands are augmented by the addition of communications protocol commands. For example, when the control application operator presses the button to send the command to illuminate the mobile devices' display the color blue, the controller sends "C.Blue" to the plurality of mobile electronic devices. In addition, the controller application will also send the appropriate communications protocol command to the communications protocol enabled devices to play a specific chord. In step 710, in addition to the existing connection to the communications protocol enabled devices, another connection is made between the communications protocol enabled devices and the controller application. In step 715, whenever the operator of the controller application selects the "Illuminate Blue" command, the mobile applications will receive that command and illuminate their display the color blue. In step 720, the communications protocol enabled devices receive the communications protocol commands and play the specific chord commanded by the controller application.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method of controlling and synchronizing a plurality of mobile electronic devices at an audience event using a controller software application on a computing device and a network of beacons, the method comprising:
   a) downloading a mobile software application onto each mobile electronic device;
   b) preparing unique configuration and content data for the controller software application for the audience event, wherein the configuration and content data varies based on the specific physical location in a venue holding the audience event;
   c) configuring the network of beacons for the venue for transmission of communications protocol commands from the controller software application on the computing device;
   d) installing the network of beacons at the venue;
   e) launching the mobile software application onto each mobile electronic device during the audience event, wherein the mobile software application prepares each mobile electronic device that does not support a communications protocol to receive a plurality of communications protocol commands from the network of beacons;
   f) determining the specific physical location of each mobile electronic device in the venue holding the audience event;
   g) transmitting wirelessly the unique configuration and content data to the plurality of mobile electronic devices during the audience event from the network of beacons based on the specific physical location in the venue during the audience event;
   h) transmitting wirelessly the plurality of communications protocol commands during the audience event from the computing device to the mobile electronic devices from the network of beacons; and
   i) recognizing and executing the plurality of communications protocol commands on the mobile electronic devices, wherein the plurality of communications protocol commands comprises a plurality of timestamps to synchronize the execution of the commands on the mobile electronic device into a unique sequential order.

2. The method of claim 1, wherein the communications protocol commands are selected from the group consisting of MIDI, OCA (Open Sound Control), DMX512 (Digital Multiplex), ART-NET, and sACN (Streaming Architecture for Control Networks).

3. The method of claim 1, wherein the specific physical location of the plurality of mobile electronic devices in the venue holding the audience event is acquired by a method selected from the group consisting of user input, GPS, beacon proximity, venue seat number, and venue section number.

4. The method of claim 1, wherein the plurality of executed communication protocol commands creates an image from the display screens from the plurality mobile electronic devices by assigning different executed communication protocol commands to display different colors based on the specific physical location of each mobile electronic device in the venue holding the audience event.

5. The method in claim 1, wherein the plurality of mobile electronic devices are each assigned to discrete groups and the plurality of executed communication protocol commands is determined by the discrete group assigned to the mobile electronic device.

6. The method of claim 1, wherein the plurality of communications protocol commands is selected from the group consisting of playing video, playing vibrations, playing camera flash patterns, illuminating screen patterns, illuminating screen colors, displaying images, displaying texts, playing sounds, playing music, streaming audio, or streaming video.

7. The method of claim 1, wherein the unique configuration and content data sent contains data elected from the group consisting of video stream data, audio playback data, image data, or text data.

8. The method of claim 1, wherein the mobile software application on each mobile device translates the plurality of communications protocol commands from the transmitted natural language to the natural language of each mobile device.

9. The method of claim 1, wherein the plurality of communications protocol commands transmitted do not interfere with mobile device protocols on the plurality of mobile electronic devices.

10. The method of claim 1, wherein the executed plurality of communications protocol commands synchronizes the plurality of mobile electronic devices in real-time to perform a specific action simultaneously.

11. The method of claim 1, wherein the plurality of communications protocol commands is transmitted in a unique sequential order in pre-defined time periods with a command code, a sequence number, a current-time for the controller software application, and a time for executing the command.

12. The method of claim 1, wherein the plurality of executed communication protocol commands creates a musical instrument emulator on the plurality mobile electronic devices to complement the music at the audience event, wherein the choice of the musical instrument emulated, the volumes and pitches of the sounds emitted by the mobile devices, and the pitches of the sound emitted is determined by the plurality of executed communication protocol commands.

13. The method of claim 1, wherein the plurality of executed communication protocol commands creates a musical instrument emulator on the plurality mobile electronic devices to complement the music at the audience event, wherein the choice of the musical instrument emulated, the volumes and pitches of the sounds emitted by the mobile devices, and the pitches of the sound emitted is determined by user input.

14. The method of claim 1, wherein the plurality of executed communication protocol commands creates a musical instrument emulator on the plurality mobile electronic devices to complement the music at the audience event, wherein the choice of the musical instrument emulated, the volumes and pitches of the sounds emitted by the mobile devices, and the pitches of the sound emitted is determined by movements of the phone selected from the group consisting of shaking, rotating, moving up, moving down, moving left, moving right, moving clockwise, moving counterclockwise, tilting up, tilting down, touching the screen, and exposing the phone to light.

15. A method of controlling and synchronizing a plurality of mobile electronic devices at an audience event using a communications protocol controller software application on a computing device and a compatible communications protocol software controller, the method comprising:
   a) downloading a mobile software application onto each mobile electronic device;
   b) preparing unique configuration and content data for the communications protocol controller software application for the audience event, wherein the communications protocol controller software application translates communication protocol commands to mobile software application commands for the plurality of mobile electronic devices;
   c) establishing a connection between the compatible communications protocol software controller and the communications protocol controller software application on the computing device;
   d) launching the mobile software application onto each mobile electronic device during the audience event, wherein the mobile software application prepares each mobile electronic device to receive a plurality of translated communication protocol commands from the communications protocol controller software application;
   e) transmitting wirelessly the unique configuration and content data to the plurality of mobile electronic devices during the audience event;
   f) transmitting a plurality of communication protocol commands from the compatible communications protocol software controller to the communications protocol controller software application during the audience event;
   g) translating the received plurality of communication protocol commands by the communication protocol controller software application into the plurality of translated communication protocol commands during the audience event;
   h) transmitting wirelessly the plurality of translated communication protocol commands from the computing device to the mobile electronic devices during the audience event; and
   i) recognizing and executing the plurality of translated communication protocol commands on the mobile electronic devices during the audience event, wherein the plurality of translated communication protocol commands comprises a plurality of timestamps to synchronize the execution of the commands on the mobile electronic device into a unique sequential order.

16. The method of claim 15, wherein the communications protocol may be selected from the group consisting of MIDI, OCA (Open Sound Control), DMX512 (Digital Multiplex), ART-NET, and sACN (Streaming Architecture for Control Networks).

* * * * *